(12) United States Patent  (10) Patent No.: US 6,674,933 B2
Troll  (45) Date of Patent: Jan. 6, 2004

(54) OPTICAL SWITCH CONTROLLED BY SELECTIVE ACTIVATION AND DEACTIVATION OF AN OPTICAL SOURCE

(75) Inventor: Mark Troll, Seattle, WA (US)

(73) Assignee: Agilent Technologies, Inc., Palo Alto, CA (US)

( * ) Notice: Subject to any disclaimer, the term of this patent is extended or adjusted under 35 U.S.C. 154(b) by 107 days.

(21) Appl. No.: 09/966,693

(22) Filed: Sep. 27, 2001

(65) Prior Publication Data
US 2003/0210848 A1 Nov. 13, 2003

(51) Int. Cl.⁷ .............................. G02B 6/26; G02B 6/42
(52) U.S. Cl. .............................. 385/16; 385/18; 385/15
(58) Field of Search ....................................... 385/15–19

(56) References Cited

U.S. PATENT DOCUMENTS

| 4,988,157 A | 1/1991 | Jackel et al. |
| 5,699,462 A | 12/1997 | Fouquet et al. |
| 6,360,775 B1 * | 3/2002 | Barth et al. ................. 137/828 |
| 2002/0122618 A1 * | 9/2002 | Kim .............................. 385/16 |
| 2002/0181835 A1 * | 12/2002 | Hu et al. ....................... 385/16 |

* cited by examiner

Primary Examiner—Michael C. Zarroli

(57) ABSTRACT

A system for manipulating optical signals in an optical switch utilizes a light-absorbing region. The region efficiently converts light to thermal energy and is in thermal communication with an index-matching fluid disposed within an intersecting gap between a first input optical waveguide and a first output optical waveguide. In one embodiment, exposing the region to optical radiation elevates the temperature of the fluid within the gap, resulting in vaporization of the fluid into gas. Filling the gap with gas creates a refractive index mismatch that causes light from the first input waveguide to be diverted to a second output waveguide. In another embodiment, the manipulation of optical signals is achieved by exposing a light-absorbing fluid to the source radiation.

25 Claims, 8 Drawing Sheets

OPTICAL SWITCH CONTROLLED BY SELECTIVE ACTIVATION AND DEACTIVATION OF AN OPTICAL SOURCE

TECHNICAL FIELD

The invention relates generally to optical switching elements and more particularly to a system and method for manipulating optical signals within an optical switch.

BACKGROUND ART

Communication utilizing optics is increasingly displacing the more traditional electronic or radio wave transmission due to its ability to accommodate a greater rate of transfer per given time. Optical signals are switched in both telecommunication systems and data communication systems. In circuit switching, any one fiber in an array of parallel input optical fibers may be connected to any one fiber in an array of output optical fibers using a matrix of optical switches. As a result, an incoming data packet from a particular input fiber can be directed to a selected output fiber, based upon the destination of the packet.

U.S. Pat. No 4,988,157 to Jackel et al. provides a bi-stable optical switching arrangement utilizing electrochemically generated bubbles. Parallel input waveguides and parallel output waveguides are formed on a substrate at perpendicular angles so as to intersect. A 45° slot is formed across each intersection. The slots are selectively filled with a fluid, such as water, or refractive index-matching fluid. Electrodes are positioned adjacent to the slots and are selectively activated to electrolytically convert the fluid to gaseous bubbles. The electrolytic formation of the bubbles destroys any index-matching properties across the slots and causes light to be reflected at the slot sidewall. Thus, an electrolytically formed bubble within a particular slot results in the reflection of optical signals at the slot, rather than the propagation across the slot. The presence of either a catalyst, an electrical pulse of opposite polarity, or an electrical pulse of significant size and of the same polarity will collapse the bubble, thereby returning the switch to a transmissive state.

Although the approach taken by Jackel et al. is simple and potentially inexpensive in large quantities, and achieves a number of advantages over prior approaches, further improvements may be realized. Where water is used as the fluid, electrolysis generates $H_2$ and $O_2$ bubbles in order to create a reflecting state, but the water provides a poor index match to the waveguides. Consequently, crosstalk is high if water is used. Another concern is that the bubble-creation process and the bubble-removal process may be too slow to meet the desired transition time for telecommunication switching. Moreover, the slots are so wide that transmission losses are potentially significant, and sidewalls are so rough that crosstalk is often large.

U.S. Pat. No 5,699,462 to Fouquet et al. provides a more promising approach. The switching arrangement of Fouquet el al. utilizes electrically driven heaters as a means for controlling the direction of the optical signals transversing the switch. Intersecting input waveguides and output waveguides are formed on a silicon substrate. In the transmissive state, an index-matching fluid fills the intersection, enabling light to continue in the input waveguide direction. To initiate switching from the transmissive to the reflective state, a heater is selectively energized to form bubbles within the intersection between the input and output waveguides. The formation of bubbles destroys any index-matching properties across the intersection, resulting in the reflection of optical signals away from the input waveguide direction. A concern with the heater approach is that there is a loss of heat to the surrounding silicon substrate, which necessarily increases the power requirement to create and hold the bubble in place. Another concern is an increase in "thermal crosstalk" between the crosspoint at the intersection of the waveguides as the temperature in the surrounding silicon substrate is elevated.

What is needed is a switching element and arrangement which allow reliable transitions between transmitting and diverting states, thereby controlling optical communication between optical signal lines.

SUMMARY OF THE INVENTION

A system and method for controlling optical signals in an optical switch utilizes a light-absorbing region or a light-absorbing fluid that is thermally responsive to radiation. Exposing the region or the fluid to radiation allows the manipulation of the fluid within an intersecting gap between a first input optical waveguide and a first output optical waveguide. In one embodiment, the manipulation of the fluid is achieved by selectively projecting radiation onto a material which defines the light-absorbing region and which is located at the intersecting gap. Subjecting the light-absorbing region to the radiation elevates the temperature of the material and therefore the fluid within the gap, resulting in the vaporization of the fluid. Alternatively, the fluid is degassed to form a bubble. Filling the gap with a gas or a bubble creates a refractive index mismatch that causes light from the first input waveguide to be diverted at the intersecting gap, so that the light does not reach the first output waveguide. The diversion is preferably in a direction of a second output optical waveguide. Refilling the gap with fluid switches the propagation of the light from the first input waveguide back to the first output waveguide. In another embodiment, the manipulation of the fluid is achieved by exposing the fluid to the source radiation, where the fluid is highly responsive to the radiation.

Each switching element in an array of such elements may be operated by vaporizing or degassing the fluid to form a small bubble at the intersecting gap for diverting the optical signals from one waveguide to another. In another embodiment, the switching element transfers the fluid from the gap to another location.

In a first embodiment, the light-absorbing region is in thermal contact with the fluid within the gap and includes physical properties for efficiently elevating the temperature of the fluid upon being exposed to the source radiation. The light-absorbing region may be formed by depositing a layer of tungsten, aluminum, copper, iron, cobalt, nickel, tantalum, niobium, zirconium, platinum or molybdenum. Other similar materials may be used. Optionally, the light-absorbing region is fabricated on a substrate (hereinafter "light-absorbing substrate") that is subsequently bonded to a waveguide substrate. In an embodiment in which there are two spaced apart light-absorbing regions, the first and the second regions are positioned relative to the gap to devise a push-pull configuration for moving the bubble in order to allow rapid switching between transmission from the first input waveguide to the first output waveguide and reflection from the first input waveguide to the second output waveguide.

In another embodiment, the manipulation of the fluid is achieved by exposing the fluid to the radiation. In this implementation, the fluid is light-absorbing such that subjecting the fluid to the radiation generates thermal energy, resulting in the elevation of the temperature within the gap to form a bubble. The fluid has a narrow absorption spectrum that includes the wavelength characteristic of the source radiation.

Alternatively, a light-absorbing dye is included within the fluid. In this implementation, the fluid is non-light-absorbing. Suitable dyes include metal phthalocyanines, metal naphthalocycanines, or metal-etraphenyl naphthocyanines.

There is a matrix of switching elements for controlling optical communications between input optical waveguides and output optical waveguides that receive signals from the input waveguides at the intersecting gaps. The "waveguides" may be optical fibers, but are typically multi-layer structures fabricated on a substrate. An acceptable implementation for the waveguides is one in which top and bottom cladded $SiO_2$ waveguides are fabricated on a silica substrate that allows for the propagation of radiation emitted by the optical source. The gap within the silica waveguide substrate (hereinafter "waveguide substrate") may be formed by etching trenches through the waveguides to provide a path for the movement of the fluid toward and away from the gap. Alternatively, liquid flow paths may be etched through the thickness of the waveguide substrate. Other flow paths are also contemplated.

The optical source for generating the source radiation may be any laser diode having the necessary optical intensity to elevate the temperature of the light-absorbing region(s), the light-absorbing fluid, or the light-absorbing dye in the non-light-absorbing fluid so as to manipulate the fluid within the gap. Preferably, the optical source is a Vertical Cavity Surface Emitting Laser (VCSEL). In the embodiment in which there is a matrix of optical switches, there can be a dedicated VCSEL for each optical switch. Alternatively, there is a single VCSEL utilized for switching a number of optical switches. In this implementation, there is a redirecting element dedicated to each optical switch for reflecting the source radiation to the light-absorbing region(s), the light-absorbing fluid, or the light-absorbing dye. The redirecting element may be a mirror or metal coated layer, but this is not critical to the invention. A controller is used to manipulate the displacement of each redirecting element.

Since current manufacturing techniques for electrically driven heaters dictate that the heater substrate be fabricated out of silicon, and since silicon is an excellent conductor of heat, a large amount of power may be required to elevate the temperature at the crosspoint of the intersecting gap to vaporize the fluid. One of the advantages of the invention is that the substrate can be chosen to have a low thermal conductivity, ensuring acceptable performance utilizing less energy. Moreover, thermal crosstalk at the cross-point of the input and output waveguides is reduced. Additionally, utilizing silica rather than silicon for the light-absorbing substrate reduces deflection of the substrate as the temperature is varied during the heating process. Other advantages in addition to or in lieu of the foregoing are provided by certain embodiments of the invention, as is apparent from the description below with reference to the following drawings.

DETAILED DESCRIPTION

Figure 1:
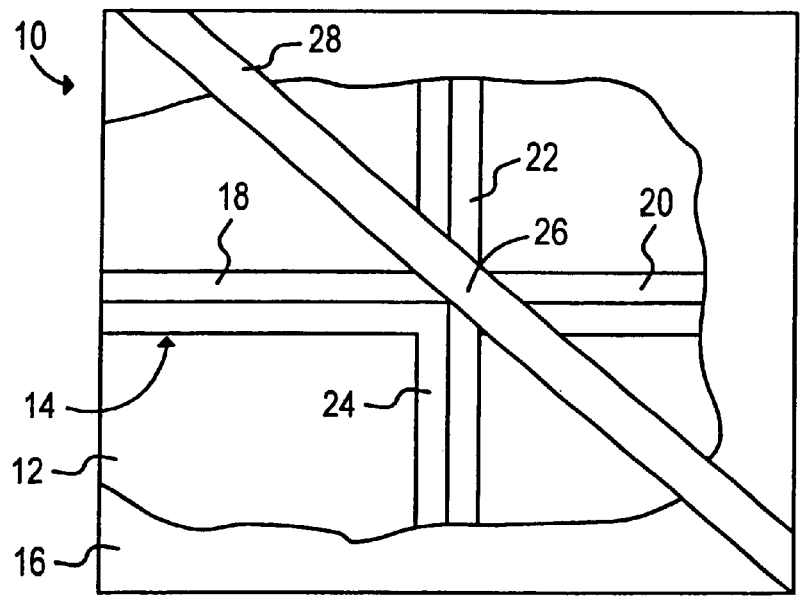
FIG. 1 is a top view of an optical switch in accordance with the invention that utilizes total internal reflection for reflecting optical signals from a first input waveguide to a second output waveguide.

FIG. 1 shows an optical switch 10 formed on a substrate in accordance with the invention. The substrate is preferably a silica substrate, as opposed to a silicon substrate. Since silica has a much smaller coefficient of thermal expansion than silicon, deflection of the structure due to temperature variations can be reduced. Alternatively, other materials with similar properties may be used. The benefit of light-transmissivity will be described below with reference to FIG. 3. The optical switch includes a planar optical waveguide defined by a lower cladding layer 12, a core 14 and an upper cladding layer 16. During fabrication, a core layer of material is deposited and etched on the lower cladding layer to form the waveguides. A first input waveguide segment 18 is aligned for transmission to a first output waveguide segment 20, while a second input waveguide segment 22 is aligned for transmission to a second output waveguide segment 24. The ends of the waveguide segments 18–24 intersect at a crosspoint within an intersecting gap 26.

The core 14 of the waveguide segments 1824 may be formed of a material that is primarily $SiO_2$, but which includes another material, such as Ge or $TiO_2$. The cladding layers 12 and 16 may be formed of a material that is primarily $SiO_2$, but which includes other materials that have a different refractive index from that of the core, such as $B_2O_3$ and/or $P_2O_5$. Because the core material has a refractive index that is different from the refractive index of the cladding layers, optical signals will be guided along the optical wave-guide segments 18–24.

A trench 28 etched through the waveguide segments 18–24 at their intersection forms the intersecting gap 26. The waveguide segments intersect the trench at an angle of incidence greater than the critical angle for total internal reflection (TIR) when the trench is filled with a vapor or gas. As a result, TIR diverts light from the first input segment 18 to the second output segment 24, unless an index-matching material is located within the intersecting gap between the aligned first input segment 18 and first output segment 20. The angle of the output segments 20 and 24 is chosen to match the angle of incidence of the respective input segments 18 and 22 on the trench, since the angle of incidence equals the angle of reflection. The trench is ideally positioned such that TIR signals are maximally coupled into the receiving output segments. As a result, optical signals can be deflected between the segments (e.g., segment 18 to 24) with minimal loss.

Figure 2:
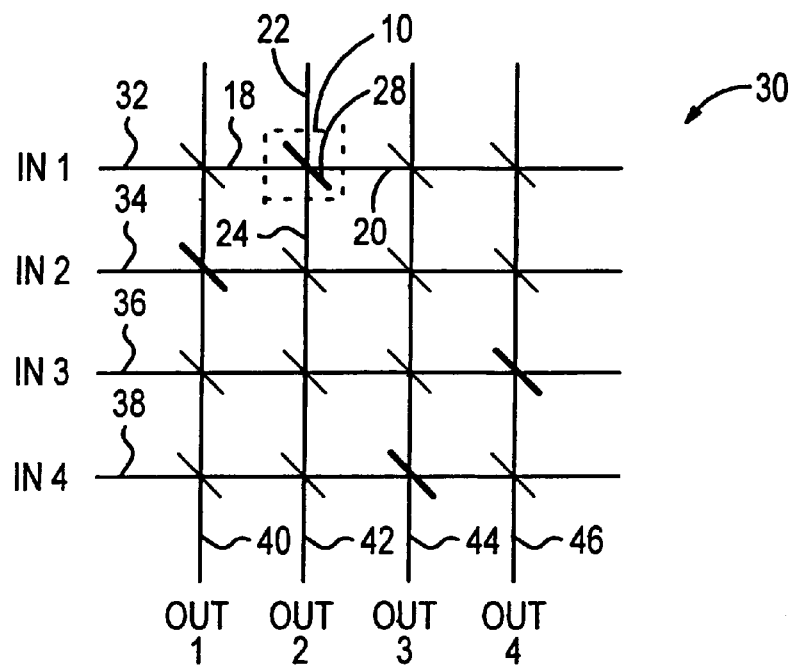
FIG. 2 is an exemplary matrix of optical switches of FIG. 1 that allows selective coupling between a linear array of input waveguides and a linear array of output waveguides.

FIG. 2 shows an exemplary 4×4 matrix 30 of optical switches. In this arrangement, any one of the four input waveguides 32, 34, 36 and 38 may be connected to any one of the four output waveguides 40, 42, 44 and 46. Thus, the switching arrangement is a non-blocking optical cross-connect switching matrix for telecommunications or data communications. Each of the sixteen optical switches defined by the four input waveguides and the four output waveguides has a trench that induces TIR in the absence of an index-matching fluid, since the angle of the trench relative to an input waveguide is selected to cause TIR from an input waveguide to a selected output waveguide. However, if the trench between collinear sections of one of the waveguides is filled with an index-matching fluid, the switch is in the transmitting state. Fluid-filled trenches are represented by fine lines (e.g., a trench defined by input waveguide 32 and output waveguide 40) that extend at an angle through intersections of optical waveguides in the array. On the other hand, trenches having an absence of index-matching fluid are represented by broad lines (e.g., a trench defined by input waveguide 32 and output waveguide 42) through a point of intersection.

With reference to FIGS. 1 and 2, the input segment 18 is in optical communication with the output segment 24 as a result of reflection at the empty trench 28. Since all other crosspoints for allowing the input waveguide 32 to communicate with the output waveguide 42 are in a transmissive state, a signal that is received at the input waveguide 32 will be transferred to the output waveguide 42. In like manner, the second input waveguide 34 is optically coupled to the first output waveguide 40, the third input waveguide 36 is optically coupled to the fourth output waveguide 46, and the fourth input waveguide 38 is optically coupled to the third output waveguide 44.

While FIG. 2 shows the input waveguides 32–38 as intersecting respective output waveguides 40–46 at 90° angles, with 45° incidence angles at the trenches, other angles are possible. For the most efficient operation, the angle of incidence of all optical signals in the input waveguide to the trench should be large enough for TIR.

In addition to the diversion approach of FIG. 1, the invention may be utilized in a modulator. That is, if the second waveguide of segments 22 and 24 is deleted, so that the first waveguide of segments 18 and 20 remains, the presence or absence of index-matching fluid within the trench 28 will determine whether a signal from the input segment 18 will be transmitted to the output segment 20. In the absence of the index-matching fluid, the signal is diverted, but it is not diverted to the output segment 24.

Figure 3:
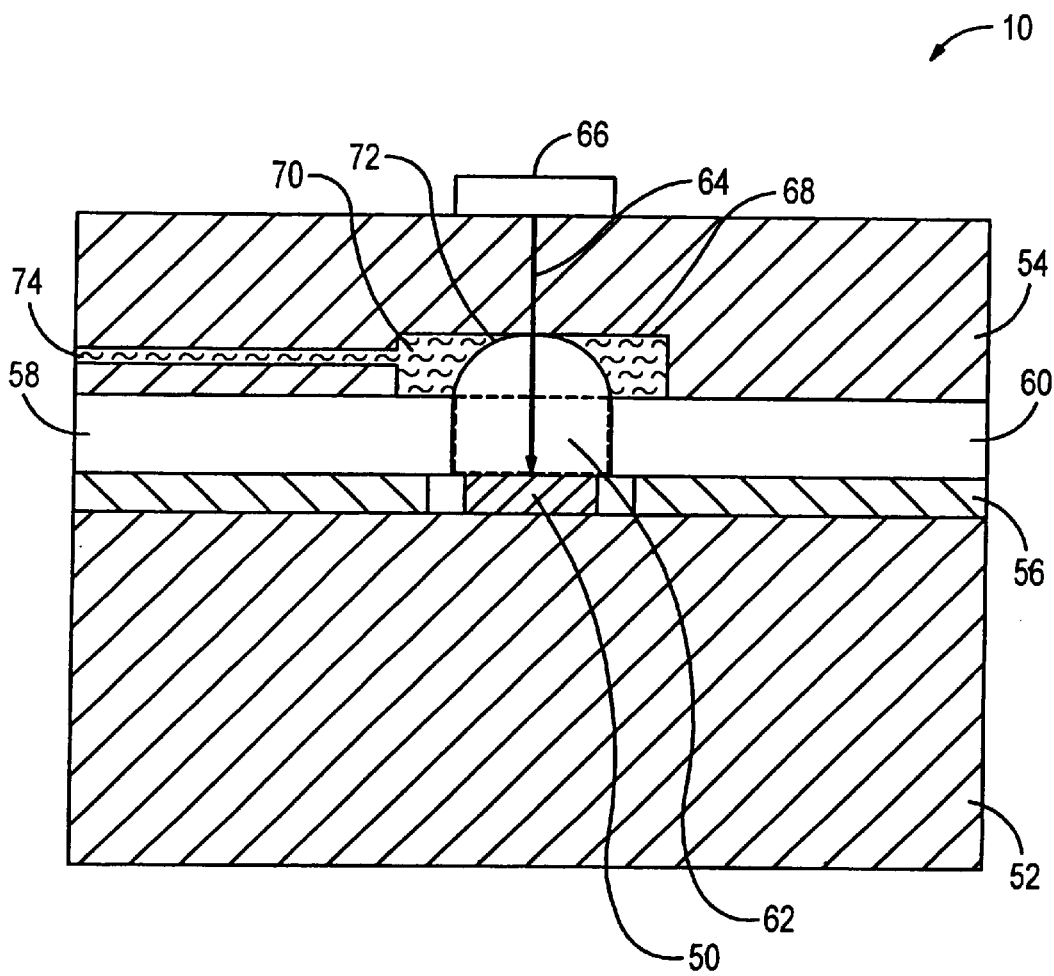
FIG. 3 is a cross-sectional view of the optical switch of FIG. 1 utilizing a light-absorbing region for manipulating optical signals in accordance with the invention.

The optical switch includes a light-absorbing region for manipulating optical signals according to a first embodiment of the invention. FIG. 3 shows a cross-sectional view of an optical switch 10 utilizing a light-absorbing region 50 for manipulating optical signals. Preferably, the light-absorbing region is made of tungsten. The optical switch comprises a light-absorbing substrate 52 and a waveguide substrate 54. The light-absorbing region is fabricated onto the light-absorbing substrate. As described earlier, the light-absorbing substrate is preferably made of silica, as opposed to silicon. Since silica has a much smaller coefficient of thermal expansion (CTE=0.58 ppm/° C. averaged from 20° C. to 77° C.) than silicon (CTE=2.78 ppm/° C. averaged from 20° C. to 77° C.), deflection of the structure as a consequence of temperature variations can be reduced.

The light-absorbing substrate 52 is bonded to the waveguide substrate 54. A pair of intersecting waveguides 58 and 60 spaced apart at an intersecting gap 62 (shown as a dashed block) are fabricated on the waveguide substrate. The waveguide substrate is made of a light-propagating material that permits source radiation 64 emitted from an optical source 66 to propagate through the waveguide substrate onto the light-absorbing region 50. Preferably, the waveguide substrate is made of silica. The waveguide substrate is shown in an inverted position, so that the "upper" cladding layer of the waveguides 58 and 60 is bonded to the spacer layer on the light-absorbing substrate. The spacer layer is preferably a solder. A chamber 68 is formed into the waveguide substrate in which an index-matching fluid 70 is introduced. The intersecting gap 62 of the trench between the waveguides is aligned with the light-absorbing region.

The light-absorbing region 50 absorbs electromagnetic radiation 64 emitted by the optical source 66. In the embodiment shown, the light-absorbing region is being exposed to the source radiation 64. The light-absorbing region converts the radiation into heat that vaporizes the surrounding index-matching fluid 70 to form a small vapor bubble 72 within the intersecting gap 62 between the two waveguides 58 and 60. The index-matching fluid is non-responsive to the source radiation. Formation of the vapor bubble creates an index mismatch that causes optical signal reflection to occur, as opposed to optical signal transmission as described above with reference to FIG. 1. Maintaining the optical switch 10 of FIG. 3 in a reflective state can be achieved by continuously irradiating the light-absorbing region for the desired duration. However, the required intensity level of the source radiation can be reduced without collapsing the vapor bubble. The switch may be returned to a transmitting state by deactivating the optical source, thereby allowing condensation to collapse the bubble.

In the optical switch 10 of FIG. 3, the projected index-matching fluid 70 ejected by the vapor bubble 72 during TIR may be cycled to a reservoir (not shown). The reservoir is a sponge. In alternative embodiments, the reservoir is not a sponge. The reservoir is in contact with a flow path 74 through the waveguide substrate 54 such that the chamber defined by the intersecting gap 62 is refilled by capillary action. The refill returns the optical switch 48 to the transmissive state. Without intervention of a valve or other actuating means, the refill may take 10 to 1000 ps depending on a number of factors, such as the cross-sectional area of the flow path.

Figure 4:
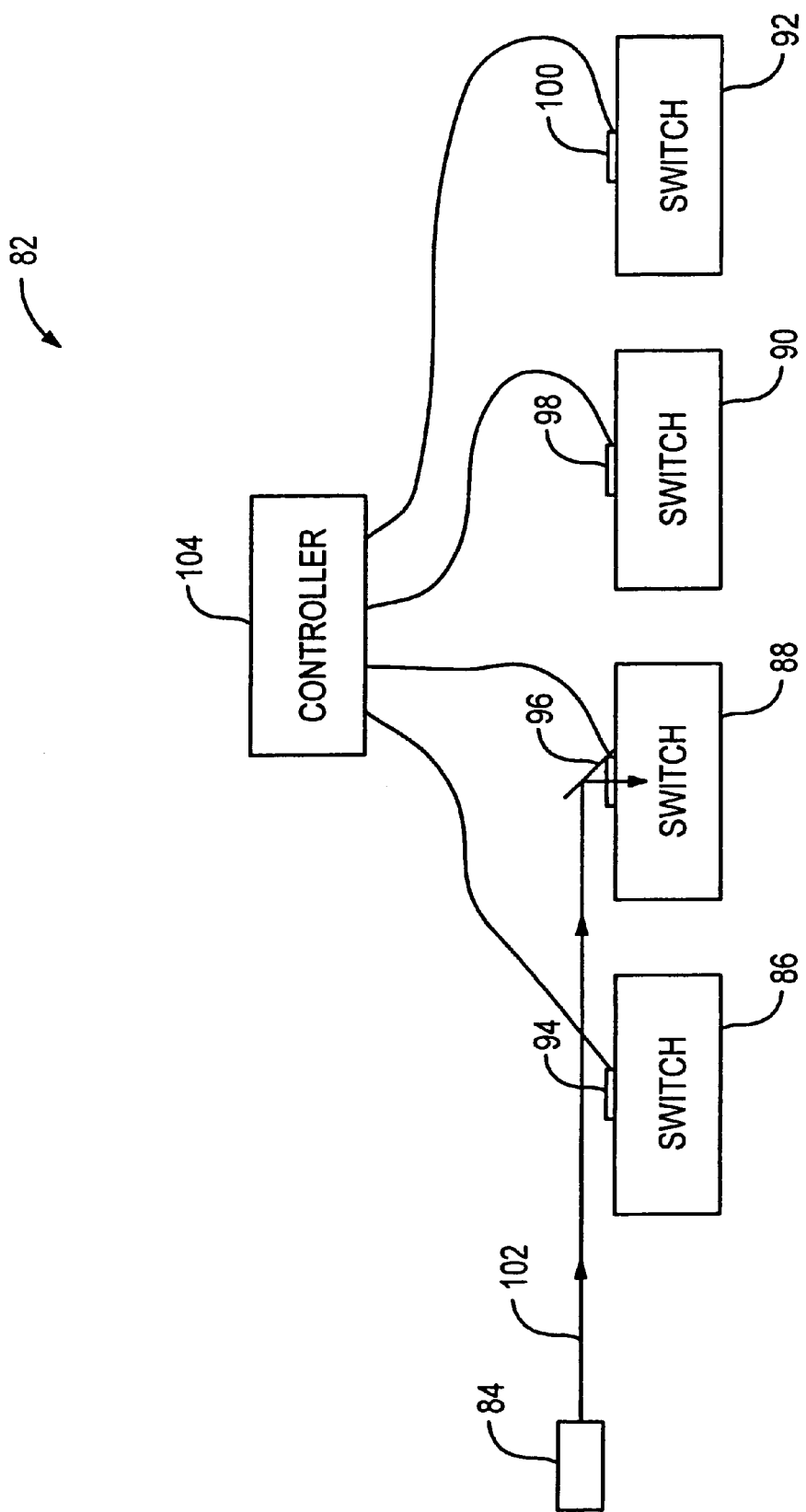
FIG. 4 is a schematic view of an optical arrangement in which one optical source is utilized for manipulating optical signals for more than one optical switch.

Preferably, the optical source 66 for emitting the source radiation 64 is a Vertical Cavity Surface Emitting Laser (VCSEL) having sufficient optical intensity or energy output to elevate the temperature of the light-absorbing region 50 so as to vaporize the index-matching fluid 70 at the intersecting gap 62. Alternatively, the optical source can be a laser diode. In the embodiment as described, there is a dedicated optical source for each optical switch 10. In an embodiment in which there is an array of optical switches, such as the exemplary 4×4 matrix 30 of FIG. 2, a single optical source may be utilized for elevating the temperature for more than one light-absorbing region. FIG. 4 shows an optical arrangement 82 in which one optical source 84 is utilized for manipulating optical signals for more than one optical switch. In this arrangement, each optical switch 86, 88, 90 and 92 includes an optical element 94, 96, 98 and 100. The optical element may be a mirror or metal coated layer, but this is not critical. Each optical element is configured to reflect source radiation 102 emitted by the optical source to its respective light-absorbing region (not shown) while in a reflective state. The displacement for each optical element is determined by a controller 104. As shown in FIG. 4, the optical element 94 is in a transmissive state so that the emitted source radiation continuously propagates without being reflected into the optical switch 86. However, the projected radiation is reflected into the optical switch 88 by the optical element 96 that is in a reflective state. The reflected radiation elevates the temperature of the light-absorbing region of the switch 88 in order to manipulate the optical signals transversing through the switch.

Figure 5:
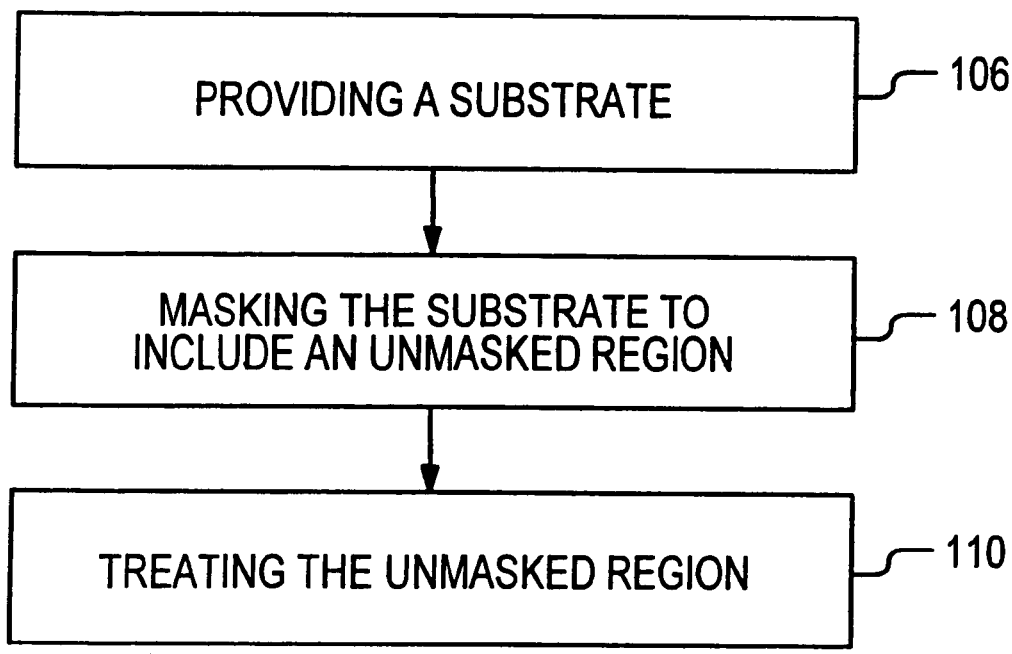
FIG. 5 is a process flow diagram for fabricating the light-absorbing region of FIG. 3.

FIG. 5 shows the steps for fabricating the light-absorbing region 50 onto the light-absorbing substrate 52 of FIG. 3. In step 106, a substrate (i.e., light-absorbing substrate) is provided. Preferably, the substrate is made of silica. In step 108, the top surface of the substrate is masked. A stencil-like pattern of the mask includes a non-masked region corresponding to an area at which the light-absorbing region 50 is formed. In step 110, the non-masked region is treated to form the light-absorbing region that absorbs the wavelength of the source radiation 64. In one embodiment, the treating step includes depositing a light-absorbing material onto the non-masked region. The light-absorbing material may be a metal or metal oxide such as tungsten, aluminum (anodized to a darkened finish), copper, iron, cobalt, nickel, tantalum, niobium, zirconium, platinum (platinum black), molybdenum, and the like. Alternatively, colored or darkened glass or ceramic materials may be employed. Moreover, the non-masked region can be treated by roughening the surface of the substrate to absorb the source radiation. Subsequent to the treating step 110, the light-absorbing substrate 52 is bonded to the waveguide substrate 54 by the spacer layer 56, with the light-absorbing region 50 of the light-absorbing substrate being aligned with the intersecting gap 62 of the waveguide substrate. Both the light-absorbing and the waveguide substrates have similar matching thermal coefficients and low thermal conductivities.

Figure 6:
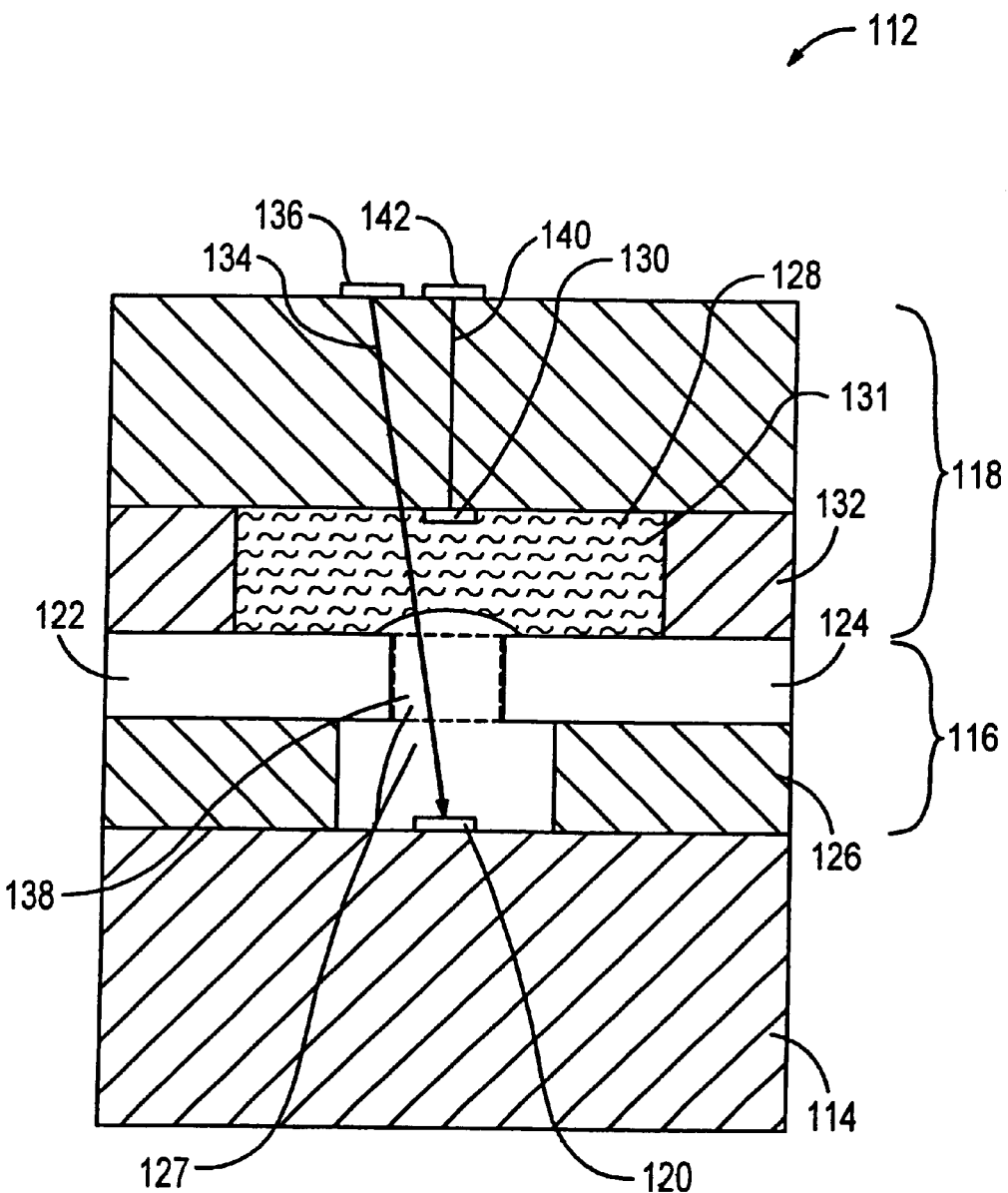
FIG. 6 is a cross-sectional view of an optical switch utilizing two light-absorbing regions for manipulating optical signals in accordance with the invention.

FIG. 6 shows an optical switch 112 utilizing two light-absorbing regions 120 and 130 for manipulating optical signals. The two light-absorbing regions provide rapid switching between transmission and reflection. The optical switch may be fabricated by using two bonds between three substrates 114, 116 and 118. The lower light-absorbing substrate 114 includes a lower light-absorbing region 120 and is similar to that of substrate 52 of FIG. 3. The waveguide substrate 116 is similar to the waveguide substrate 54, but is thinner. In other embodiments, the substrate 116 has a thickness that is at least equivalent to that of substrate 114 or 118. The "upper" cladding layer of the two crossing waveguides 122 and 124 is bonded to a layer 126 that defines a waveguide substrate chamber 127 for storing an index-matching fluid 128 while the optical switch is in a transmissive state. The waveguide substrate chamber includes an intersecting gap 138. The upper light-absorbing substrate 118 includes an upper light-absorbing region 130, a light-absorbing substrate chamber 131, and a chamber-defining layer 132 that is bonded to the waveguide substrate.

To facilitate rapid switching from the transmissive to the reflective state, a first source radiation 134 emitted by a first optical source 136 irradiates the lower light-absorbing region 120. Upon being exposed to the first source radiation, the lower light-absorbing light-absorbing region converts the radiation into heat, thereby vaporizing the surrounding index-matching fluid 128. The fluid vapor displaces the index-matching fluid from the intersecting gap 138 (shown as a dashed block) into the light-absorbing substrate chamber 131 defined by the layer 132. In this condition, the intersecting gap between the waveguides 122 and 124 is fluid-free, so that the optical switch is in the reflecting state. While not shown, there may be a flow path coupled to a reservoir to provide a means for initially introducing the index-matching fluid and for replenishing the fluid when needed. A rapid return to the transmissive state can be achieved by irradiating the upper light-absorbing region 130 with a second source radiation 140 emitted by a second optical source 142 to propel the fluid to fill the intersecting gap 138.

Figure 7:
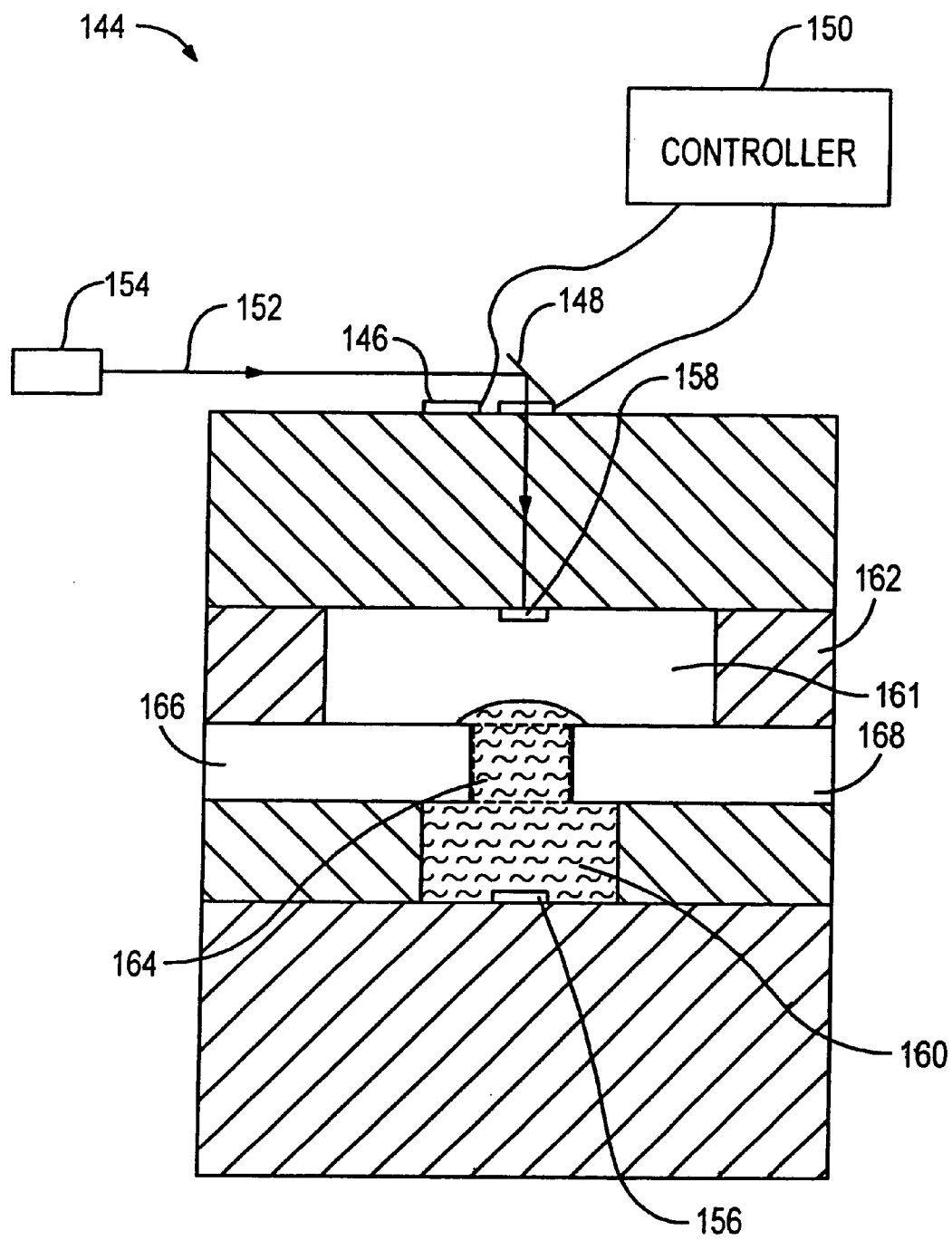
FIG. 7 is a schematic view of an optical switch of an alternative embodiment in accordance with the invention having two light-absorbing regions in which one optical source is utilized for manipulating signals associated with each light-absorbing region.

The optical switch 112 includes a dedicated optical source configured to irradiate a particular light-absorbing region (i.e., source 136 for irradiating region 120 and source 142 for irradiating region 130). Alternatively, by having a dedicated optical element (e.g., mirror or metal coated layer) for reflecting the source radiation to either light-absorbing region, a single optical source may be utilized. FIG. 7 shows an optical switch 144 having two optical elements—a first optical element 146 in a transmissive state and a second optical element 148 in a reflective state. The displacement of each optical element is manipulated by a controller 150. In its transmissive state, the optical element 146 is configured to allow a source radiation 152 emitted by an optical source 154 to propagate without reflecting the radiation onto a lower light-absorbing region 156. However, the propagating radiation is reflected onto the upper light-absorbing region 158 by the optical element 148, while in a reflective state. In this condition, an index-matching fluid 160 is projected away from a chamber 161 defined by a layer 162 to fill an intersecting gap 164 (shown as a dashed block) to allow optical transmissive communication between the waveguides 166 and 168.

Figure 8:
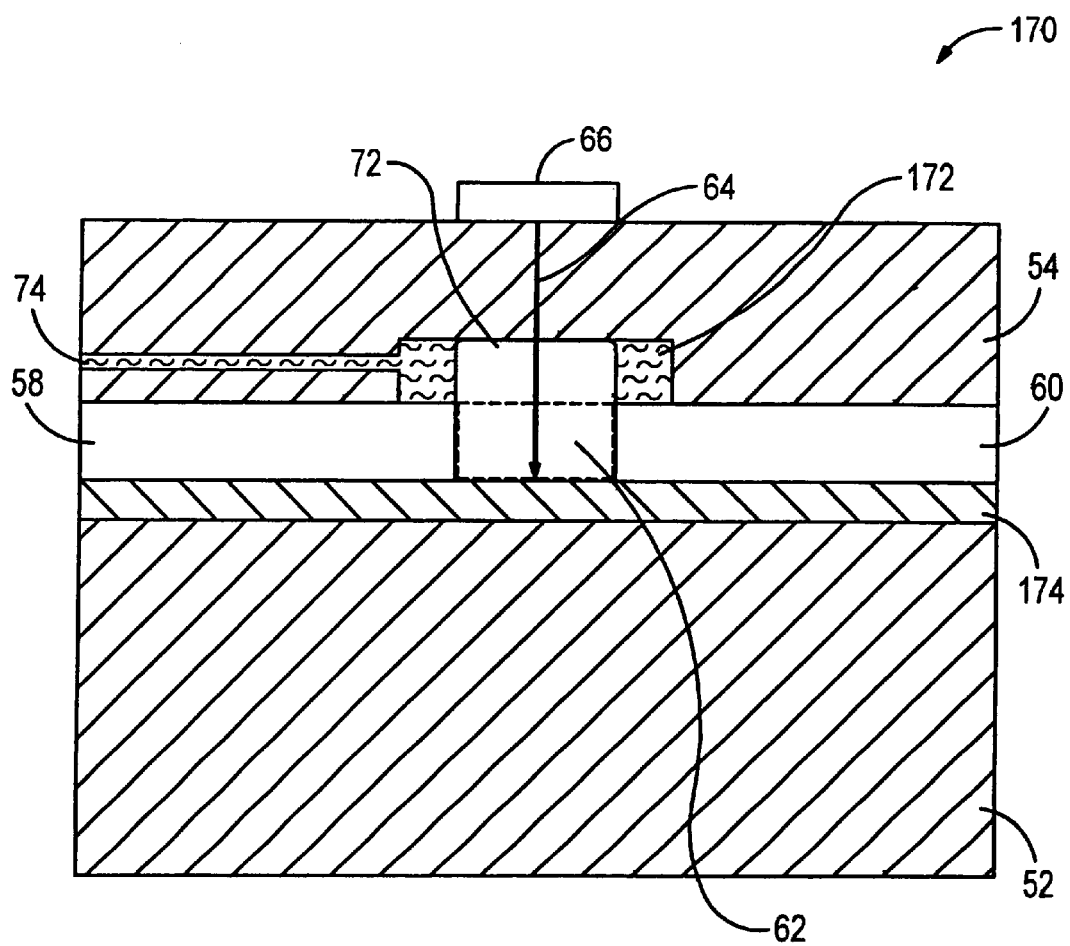
FIG. 8 is a cross-sectional view of an optical switch in accordance with the invention utilizing a light-absorbing fluid for manipulating optical signals.

In another embodiment, FIG. 8 shows an optical switch 170 utilizing a light-absorbing fluid 172 for manipulating optical signals, as opposed to utilizing the light-absorbing region 50 of the optical switch 10 in the embodiment of FIG. 3. Since the structural arrangement for the optical switch 170 is similar to that of the optical switch 10, many reference numerals of FIG. 3 will be used to identify the same components shown in FIG. 8. Other than the light-absorbing fluid, the only notable difference between the switches 10 and 170 is a continuous spacer layer 174 for bonding the waveguide substrate 54 and the light-absorbing substrate 52 of FIG. 8.

Similar to the light-absorbing properties of the light-absorbing region 50, the light-absorbing fluid 172 of the optical switch 170 of FIG. 8 absorbs the source radiation 64 such that upon being exposed to the radiation (shown as a bolded arrow), the fluid converts the radiation into heat to form a vapor bubble 72 within the intersecting gap 62 between the two waveguides 58 and 60. The fluid has a narrow absorption spectrum that includes the wavelength of the source radiation. The absorption spectrum must exclude the wavelengths of the light signals that propagate through the waveguides 58 and 60. As a result, the fluid has an absorption at the radiation wavelengths utilized for heating and a negligible absorption at the signal wavelengths utilized for optical communication. Preferably, the signal wavelengths are between 1270 nm to 1600 nm, which is the standard wavelength range for optical communication.

Figure 9:
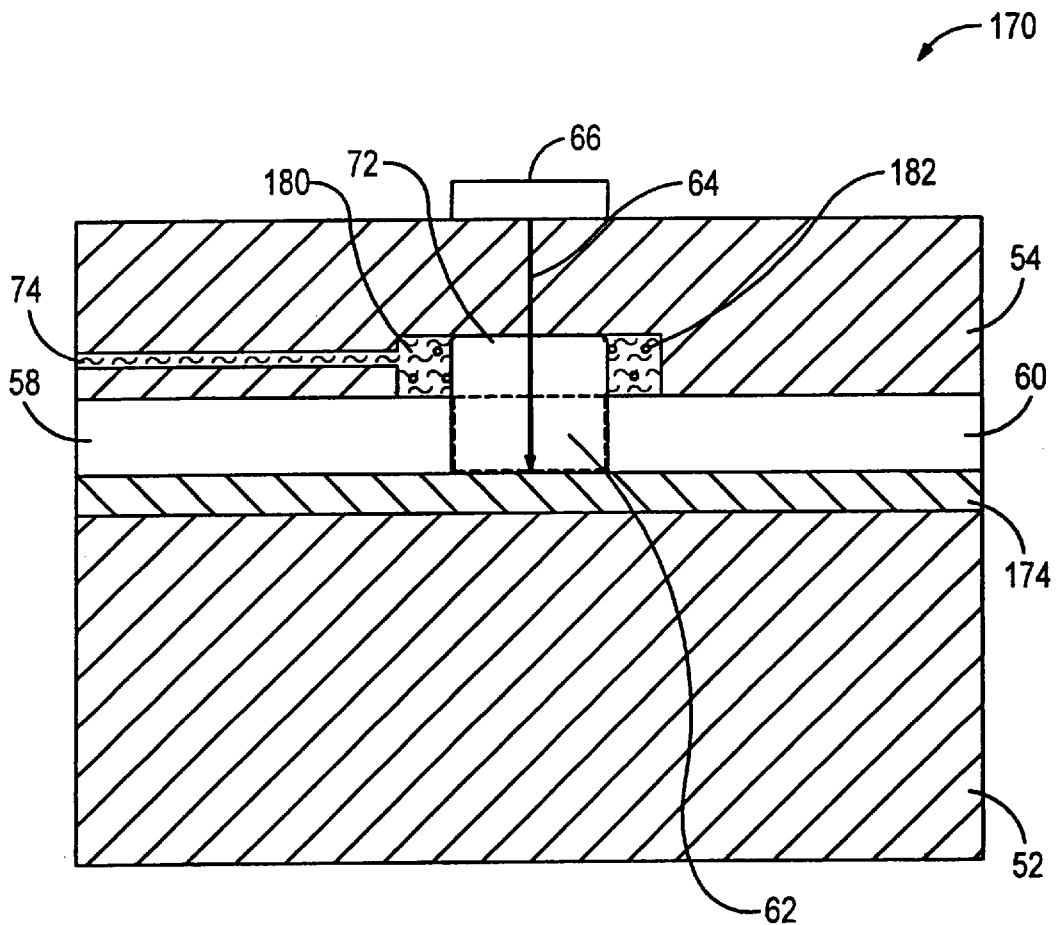
FIG. 9 is a cross-sectional view of the optical switch of FIG. 8 utilizing a light-absorbing dye for manipulating optical signals.

FIG. 9 shows the optical switch 170 utilizing a non-light-absorbing fluid 180 for manipulating optical signals. In this embodiment, the. non-light-absorbing fluid is non-responsive to the source radiation 64. However, a light-absorbing dye 182 is included within the fluid. The dye absorbs the source radiation such that upon being exposed to the radiation (shown as a bolded arrow), the dye converts the radiation into heat, which vaporizes the surrounding fluid to form the vapor bubble 62. The dye includes an absorption spectrum that includes the wavelength of the source radiation, but excludes the wavelength of the light signals that propagate through the waveguides 58 and 60.

Suitable dyes include metal-cyanines from the families metal phthalocyanines, metal naphthalocyanines, and metal-tetraphenyl naphthocyanines. The metal phthalocyanines family includes vanadyl phthalocyanine ($\lambda$=699 nm) and its derivatives, such as vanadyl 2, 9, 16, 23-tertraphenoxy-29H, or 31H (phthalocyanine); nickel phthalocyanine ($\lambda$=670 nm); cobalt (ii) phthalocyanine ($\lambda$=677 nm); copper (II) phthalocyanine ($\lambda$=694 nm); copper (II) 1, 4, 8, 11, 15, 18, 22, 25-octabutoxy-29H, and 31H-phthalocyanine ($\lambda$=740 nm); titanyl phthalocyanine ($\lambda$=692 nm); or zinc phthalocyanine ($\lambda$=701 nm). The metal-naphthalocyanines family includes vanadyl 2, 11, 20, 29-tetra-tert-butyl-2, 3-naphthalocyanine ($\lambda$=766 nm); cobalt (II) 2, 3-naphthalocyanine ($\lambda$=731 nm); copper (II) 5, 9, 14, 18, 23, 27, 32, 36-octabutoxy-2; 3-naphthalocyanine ($\lambda$=853 nm); and zinc 2, 11, 20, 29-tetra-tert-butyl-2, or 3-naphthalocycanine ($\lambda$=769 nm). Finally, in the metaltetraphenyl naphthocyanines family, vanadyl 5, 14, 23, 32-tetraphenyl-2, or 3-naphthocycanine ($\lambda$=846 nm) may be used. The identified metal-cyanines are described only as exemplary compounds for use as a suitable light-absorbing dye. Other compounds or substances may be used without diverging from the scope of the invention.

While the embodiments associated with FIGS. 8 and 9 are described as utilizing a dedicated optical source 66 for each optical switch, other embodiments, such as the one described in FIG. 4 in which one optical source is used for a number of switches, may be used. Moreover, while the identified embodiments utilize bubble techniques by vaporizing the index-matching fluid at the intersecting gap to manipulate optical signals, other bubble techniques including degassing or those employed in inkjet printing may be used without diverging from the scope of the invention as defined in the following claims.

What is claimed is:

1. A switching element comprising:
    an optical source for emitting optical radiation; and
    a first optical waveguide and a second optical waveguide having ends that intersect at a gap, said gap being positioned such that optical coupling between said first and second waveguides is determined by a presence of a fluid within said gap, said fluid being selectively vaporized to form a vapor bubble within said gap in response to heating induced by said optical radiation.

2. The switching element of claim 1 further comprising a first light-absorbing region in thermal communication with said gap, said first light-absorbing region heating said fluid within said gap upon exposure to said optical radiation.

3. The switching element of claim 2 wherein said first region is a metallic medium positioned for irradiation by said optical radiation.

4. The switching element of claim 3 wherein said metallic medium includes at least one of tungsten, aluminum, copper, iron, cobalt, nickel, tantalum, niobium, zirconium, platinum and molybdenum.

5. The switching element of claim 2 further comprising a second light-absorbing region, said second region and said first region being on opposite sides of said gap, wherein said second region is in thermal communication with said gap and heating said fluid upon exposure to said optical radiation.

6. The switching element of claim 1 wherein said fluid is thermally responsive to said optical radiation, such that the temperature of said fluid is elevated upon being exposed to said optical radiation.

7. The switching element of claim 6 wherein said fluid includes a light-absorbing composition that absorbs said optical radiation.

8. The switching element of claim 7 wherein said light-absorbing composition includes one of metal phthalocyanines, metal naphthalocyanines and metal-tetraphenyl naphthocyanines.

9. The switching element of claim 1 further comprising at least one manipulable redirecting element for reflecting said optical radiation emitted from said optical source.

10. The switching element of claim 9 further comprising a controller for manipulating said redirecting element.

11. The switching element of claim 1 wherein said first and second waveguides are optically coupled when said fluid is within said gap, said switching element further comprising a third optical waveguide intersecting said gap on a side opposite to said second waveguide such that said first and third waveguides are optically coupled when said fluid is absent from said gap.

12. A switching arrangement for defining a transmitting state and a reflecting state comprising:
    an emitting source for generating light; and
    first and second light-transmitting waveguides having ends extending to a chamber such that optical communication from a first end of said first waveguide to a second end of said second waveguide is determined by movement of a fluid within said chamber, said fluid being selectively vaporized by activation and deactivation of said emitting source, said emitting source being configured to emit light at sufficient intensity to define said reflecting state upon activation and being controlled to define said transmitting state upon deactivation.

13. The switching arrangement of claim 12 further comprising a thermally responsive region in optical communication with said emitting source, said thermally responsive region being configured to generate heat in said chamber to move said fluid upon being exposed to said light.

14. The switching arrangement of claim 13 wherein said thermal region is formed on a silica substrate, said emitting source being positioned to direct said light through said silica substrate.

15. The switching arrangement of claim 12 further comprising a thermally responsive substance in said fluid, said substance being in optical communication with said emitting source and having physical properties for generating heat in said chamber to move said fluid upon being exposed to said radiation.

16. The switching arrangement of claim 12 wherein said fluid has an index of refraction similar to an index of refraction of said first and second light-transmitting waveguides.

17. The switching arrangement of claim 12 wherein said emitting source is a Vertical Cavity Surface Emitting Laser (VCSEL).

18. The switching arrangement of claim 12 wherein said emitting source is a laser diode.

19. The switching arrangement of claim 12 wherein said first and second light transmitting waveguides are formed on a waveguide substrate, said substrate having properties for allowing propagation of said radiation through said substrate from said emitting source to said fluid chamber.

20. The switching arrangement of claim 19 wherein said waveguide substrate includes silica.

21. The switching arrangement of claim 12 wherein a bubble is formed within said fluid when said emitting source is activated, thereby initiating displacement of said fluid relative to said fluid chamber.

22. A method for controlling an optical signal comprising:
providing a plurality of optical waveguides, including providing an intersecting gap at ends of said waveguides such that optical coupling of an input waveguide to operatively associated first and second output waveguides is dependent by a presence and absence of a fluid disposed within said gap; and
switching said optical coupling of said input waveguide by selectively activating a light source, said activating of said light source resulting in a fluidic change within said gap such that said optical signal from said input waveguide is diverted from communication with said first output waveguide by propagation through said gap to communication with said second output waveguide by reflection at said gap.

23. The method of claim 22 wherein said switching includes activating said light source to project light onto a light-absorbing region, said light-absorbing region being in thermal communication with said fluid such that said fluid is displaced relative to said gap when said light-absorbing region is exposed to said light.

24. The method of claim 22 wherein said step of switching includes activating said light source to project light into said fluid such that said fluid is displaced relative to said gap.

25. The method of claim 24 wherein said fluid includes a light-absorbing substance that is optically sensitive to said light.

* * * * *